UNITED STATES PATENT OFFICE.

WILLIAM P. UPHAM, OF KEENE, NEW HAMPSHIRE, ASSIGNOR TO ROS-AUX COMPANY, OF BOSTON, MASSACHUSETTS, A CORPORATION OF MASSACHUSETTS.

SIZING AND METHOD OF MAKING THE SAME.

1,392,988.   Specification of Letters Patent.   Patented Oct. 11, 1921.

No Drawing.   Application filed January 29, 1917.  Serial No. 145,144.

*To all whom it may concern:*

Be it known that I, WILLIAM P. UPHAM, a citizen of the United States, residing at Keene, county of Cheshire, State of New Hampshire, have invented an Improvement in Sizing and Methods of Making the Same, of which the following description is a specification.

This invention relates to a sizing and method of making the same, and the objects of the invention are to provide an improved sizing which is capable of general use wherever sizing is desired. My improved sizing has a foundation of vegetable starch or its equivalent which is specially treated to render it free flowing and which is mixed with a specially-prepared rosin compound. The starch constituent gives stiffness and adhesive properties to the size, and the rosin constituent gives thereto flexibility or pliability as well as adhesive properties. When the size is used, it gives the article to which it is applied the desired stiffness, but at the same time it is sufficiently flexible so that it will not break or crack when the article is bent. While a size made in accordance with my invention is capable of general use, it has special advantages when used as a sizing for coating paper as will be presently described.

In making my improved sizing I first prepare the rosin constituent thereof. This is done by cutting commercial rosin with caustic soda or some other suitable alkali, the cutting process preferably being done under pressure. A certain amount of oil, either animal, vegetable or mineral oil, is preferably added to this rosin constituent either during or after the cutting or saponifying operation. This cutting or saponifying operation will, as stated above, preferably be performed under pressure. The caustic soda or other alkali may be placed in a digester and the rosin will preferably be melted and deposited gradually in a melted condition into the caustic soda or any other alkali solution. This may be accomplished by providing a digester with a compartment for receiving the caustic soda or other alkali and a perforated partition above the compartment on which the rosin may be placed. When the heat is applied, the rosin will melt and gradually drip into the caustic soda. The caustic soda or any other alkali should be stirred while the rosin is being introduced thereto, and during the cutting or saponifying operation. This cutting operation, as stated above, will be carried on under moderate pressure, such, for instance, as twenty to thirty pounds.

A sufficient quantity of some mineral, animal or vegetable oil is preferably added either during or after the cutting operation. While various oils may be employed, I would prefer to use a mineral oil or a vegetable oil, such as olive oil, or palm oil, although the particular kind of oil is not essential. The oil mixes with the rosin and produces a composition having more flexibility and pliability and greater toughness than a rosin composition without the oil. The presence of the oil also promotes the proper amalgamation of the starch and rosin constituents when they are mixed together.

The rosin composition when thus made is a semi-liquid viscous mass.

The amount of oil which is added to the rosin may be varied according to the use to which the sizing is put and according to the characteristics which it is desired the finished sizing should have. Generally speaking, the amount of oil which is added will be from five to twenty-five per cent. of the rosin composition.

The starchy or equivalent constituent of the sizing may be made from any starch material, such as cornstarch, flour of any kind or any vegetable starch, or tapioca, or similar material. This starch ingredient is hydrolyzed under pressure with a suitable acid or alkali. I will preferably use hydrochloric acid for this purpose, although acetic acid or any other suitable acid or an alkali may be used. The hydrolyzation will preferably take place under pressure and the influence of heat. This can be done by performing the operation in a steam-tight drum or digester, the starch or its equivalent and the proper quantity of acid and water being placed in the drum and then heated and stirred. This hydrolyzing operation can be carried to any desired extent, depending on the particular characteristics which it is desired the completed sizing should have. The amount of acid which is used in this hydrolyzing operation may be varied. The more acid which is used the less cooking will be necessary to complete the hydrolyzation and the less acid that is used, the longer the cooking should continue.

I find from experiments that by hydrolyzing the starch or its equivalent under pressure, a superior product is produced which makes an improved quality of size. In practice, the desired pressure may conveniently be provided by carrying on the hydrolyzing operation in a steam-tight drum which is subjected to heat. The amount of pressure may be varied without departing from the invention, but I find that good results can be obtained when the hydrolyzing is done under a pressure of from twenty to thirty pounds.

After the rosin constituent and the starchy constituent have thus been prepared, they are mixed together in any desired proportions to produce the completed sizing. The particular proportion in which they are mixed depends on the use to which the size is to be put. As a general rule, the proportion of the starch ingredient will be greater than that of the resinous ingredient.

The size which is thus produced has great strength and high adhesive qualities so that it will firmly adhere to any surface to which it is applied, but at the same time it is flexible enough so that when dry it will not crack or crumble when the article to which it is applied is bent or distorted.

A sizing made from the above ingredients is especially useful in coating paper. The ordinary method of coating paper is to apply thereto a coating material made of some sizing with which is mixed clay or satin white, the coating material being rubbed or brushed onto the paper and being for the purpose of producing a smooth level surface on the paper. When paper comes from the paper-making machine, it always has a more or less uneven surface. In some kinds of printing, as, for instance, printing halftones, it is important that the paper should have a perfectly level surface in order to produce a proper print, and the coating of the paper is for the purpose of giving it this necessary level smooth surface. The character of the sizing used, therefore, is of importance in this coating operation. I have found from experiment that when my improved sizing is mixed with clay or satin white, a superior coating material is made which can be readily spread on the surface of the paper and worked by means of brushes or otherwise into a perfectly level surface, and which when dry will produce a finish which will not crack or break when the paper is folded.

The hydrolyzation of the starch constituent breaks down the cellular structure thereof and produces a compound which when mixed with the rosin composition, as above described, produces a sizing which will readily mix with satin white or clay, and the coating material thus produced makes a superior coating material for paper.

I have also found that my improved sizing has no tendency to foam as it is being brushed onto the paper to develop the desirable level surface, notwithstanding the fact that it contains a rosin ingredient. The normal tendency of a rosin composition is to produce foam when it is agitated, but my improved sizing has the characteristic that all tendency to foam is eliminated. This is another reason why it is especially useful in coating paper.

I claim:

1. A sizing containing a mixture of a starchy constituent hydrolyzed under pressure and a saponified rosin constituent.

2. A sizing comprising a mixture of a starchy constituent hydrolyzed under pressure and a saponified rosin constituent containing oil.

3. A sizing comprising a mixture of a starchy constituent hydrolyzed under pressure, and a rosin constituent saponified under pressure and containing oil.

4. The steps in the process of making a sizing which consist in saponifying rosin under pressure, hydrolyzing a starchy compound under pressure, and mixing the constituents thus produced.

5. The process of making a sizing which consists in saponifying rosin under pressure and adding an oily substance thereto, hydrolyzing starch under pressure and then mixing the rosin constituent and the starch constituent thus produced.

6. A coating material for coating paper comprising a sizing formed of a mixture of a starch constituent hydrolyzed under pressure and a rosin constituent, which sizing has a mineral surfacing material incorporated therewith.

In testimony whereof, I have signed my name to this specification.

WILLIAM P. UPHAM.